(12) United States Patent
Chan et al.

(10) Patent No.: US 11,017,430 B2
(45) Date of Patent: May 25, 2021

(54) DELIVERING ADVERTISEMENTS BASED ON USER SENTIMENT AND LEARNED BEHAVIOR

(71) Applicant: International Business Machines Corporation, Armonk, NY (US)

(72) Inventors: Yuk L. Chan, Rochester, NY (US); Heidi Lagares-Greenblatt, Jefferson Hills, PA (US); Jenny S. Li, Cary, NC (US); Deepti M. Naphade, Cupertino, CA (US); Xinlin Wang, Irvine, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 96 days.

(21) Appl. No.: 16/193,206

(22) Filed: Nov. 16, 2018

(65) Prior Publication Data

US 2020/0160385 A1 May 21, 2020

(51) Int. Cl.
*G06Q 30/00* (2012.01)
*G06Q 30/02* (2012.01)

(52) U.S. Cl.
CPC ..... *G06Q 30/0255* (2013.01); *G06Q 30/0271* (2013.01)

(58) Field of Classification Search
None
See application file for complete search history.

(56) References Cited

U.S. PATENT DOCUMENTS

| | | | | |
|---|---|---|---|---|
| 7,107,227 | B1 * | 9/2006 | Bezos | G06Q 30/0275 705/14.71 |
| 9,363,546 | B2 | 6/2016 | Burger et al. | |
| 9,514,481 | B2 | 12/2016 | Kumar et al. | |
| 9,600,715 | B2 | 3/2017 | Natan et al. | |
| 9,619,834 | B2 * | 4/2017 | Tedjamulia | G06Q 10/10 |
| 9,773,257 | B1 * | 9/2017 | Bodell | G06Q 30/0251 |
| 2002/0010639 | A1 * | 1/2002 | Howey | G06Q 30/02 705/26.1 |
| 2002/0046104 | A1 * | 4/2002 | Kaddeche | G06Q 30/0258 705/14.56 |

(Continued)

FOREIGN PATENT DOCUMENTS

CN 103137043 A 6/2013

OTHER PUBLICATIONS

STIC EIC 3600 Search Report for application 16193206 dated Sep. 3, 2020. (Year: 2020).*

(Continued)

*Primary Examiner* — Matthew T Sittner
(74) *Attorney, Agent, or Firm* — Cantor Colburn LLP; Teddi Maranzano

(57) ABSTRACT

Provided are embodiments including a method, system, and computer program product for identifying how to deliver advertisements to a user based on the user sentiment and learned behavior. The embodiments provide for collecting information on the sentiment of a user, monitoring user interactions based at least in part on the collected emotional information on the sentiment of the user, and determining a pattern of user interactions with one or more applications of a user device based on the sentiment information. The embodiments also provide for determining a pattern of user responses to an advertisement based on the sentiment information, and generating a profile based at least in part on the pattern of user interactions and the pattern of user responses.

15 Claims, 6 Drawing Sheets

(56) References Cited

U.S. PATENT DOCUMENTS

| | | | | |
|---|---|---|---|---|
| 2002/0123928 A1* | 9/2002 | Eldering | ............ | G06Q 30/0255 705/14.52 |
| 2002/0143661 A1* | 10/2002 | Tumulty | .............. | H04M 3/523 705/7.36 |
| 2002/0147628 A1* | 10/2002 | Specter | .............. | G06Q 30/0241 705/26.7 |
| 2003/0065636 A1* | 4/2003 | Peyrelevade | ...... | G06Q 30/0601 706/62 |
| 2003/0110503 A1* | 6/2003 | Perkes | .................. | H04N 21/84 725/86 |
| 2003/0163359 A1* | 8/2003 | Kanesaka | .......... | G06Q 30/0204 705/7.33 |
| 2005/0086605 A1* | 4/2005 | Ferrer | .................... | G06Q 30/02 715/745 |
| 2005/0180549 A1* | 8/2005 | Chiu | .................. | H04M 3/4938 379/88.16 |
| 2005/0288954 A1* | 12/2005 | McCarthy | ............. | G06Q 50/22 705/2 |
| 2006/0015390 A1* | 1/2006 | Rijsinghani | ........... | G06F 16/958 705/7.29 |
| 2006/0170945 A1* | 8/2006 | Bill | ........................ | H04L 29/06 358/1.13 |
| 2006/0173838 A1* | 8/2006 | Garg | ....................... | G06Q 30/02 |
| 2006/0235753 A1* | 10/2006 | Kameyama | ............ | B60Q 1/143 705/15 |
| 2007/0052517 A1* | 3/2007 | Bishop | .................. | G06Q 20/32 340/5.2 |
| 2007/0113181 A1* | 5/2007 | Blattner | .................. | G06F 3/011 715/706 |
| 2007/0168216 A1* | 7/2007 | Lemelson | .............. | G06Q 30/00 705/26.1 |
| 2007/0238934 A1* | 10/2007 | Viswanathan | ........... | A61B 5/16 600/300 |
| 2007/0240230 A1* | 10/2007 | O'Connell | .............. | G06F 21/55 726/28 |
| 2007/0243509 A1* | 10/2007 | Stiebel | .................. | G06Q 30/02 434/236 |
| 2007/0250390 A1* | 10/2007 | Lee | ........................ | G06Q 30/02 705/14.51 |
| 2007/0294140 A1* | 12/2007 | Bezos | .................... | G06Q 30/08 705/26.1 |
| 2008/0091510 A1* | 4/2008 | Crandall | ............ | G06Q 30/0204 705/7.32 |
| 2008/0222295 A1* | 9/2008 | Robinson | ............... | G06Q 10/10 709/227 |
| 2008/0270398 A1* | 10/2008 | Landau | .................. | G06Q 30/02 |
| 2008/0306830 A1* | 12/2008 | Lasa | ........................ | G06Q 30/02 705/14.16 |
| 2009/0099853 A1* | 4/2009 | Lemelson | .............. | G06Q 30/02 705/319 |
| 2009/0222838 A1* | 9/2009 | Ho | ...................... | G06F 16/9537 719/314 |
| 2009/0265220 A1* | 10/2009 | Bayraktar | .......... | G06Q 30/0269 705/14.53 |
| 2010/0145203 A1* | 6/2010 | Kim | ..................... | G10H 1/0041 600/509 |
| 2010/0168994 A1* | 7/2010 | Bourque | .......... | G08G 1/096883 701/532 |
| 2010/0325135 A1* | 12/2010 | Chen | .................... | G10H 1/0008 707/759 |
| 2011/0082731 A1* | 4/2011 | Kepecs | .............. | G06Q 30/0215 705/14.17 |
| 2011/0106375 A1* | 5/2011 | Gurusamy Sundaram | ................... | H04W 4/60 701/31.4 |
| 2011/0148916 A1* | 6/2011 | Blattner | ................ | H04L 67/306 345/619 |
| 2011/0161172 A1* | 6/2011 | Lee | .................... | G06Q 30/0257 705/14.55 |
| 2011/0173198 A1* | 7/2011 | Malleshaiah | ......... | G06F 16/337 707/737 |
| 2011/0223571 A1* | 9/2011 | Farahat | .................. | G06Q 30/02 434/236 |
| 2011/0225021 A1* | 9/2011 | Kantak | .............. | G06Q 30/0201 705/7.29 |
| 2011/0225043 A1* | 9/2011 | Bhatia | ................ | G06Q 30/0255 705/14.53 |
| 2011/0225049 A1* | 9/2011 | Bhatia | .................... | G06Q 30/02 705/14.66 |
| 2011/0276406 A1* | 11/2011 | Sneyders | ............... | G06Q 30/02 705/14.66 |
| 2012/0047013 A1* | 2/2012 | Bigby | .................... | G06Q 30/02 705/14.52 |
| 2012/0047448 A1* | 2/2012 | Amidon | ................ | H04W 4/029 715/753 |
| 2012/0136941 A1* | 5/2012 | Howes | .................... | H04L 51/14 709/206 |
| 2012/0143685 A1* | 6/2012 | Miller | .................... | G06Q 40/08 705/14.52 |
| 2012/0143693 A1* | 6/2012 | Chung | ............... | G06Q 30/0241 705/14.66 |
| 2012/0151383 A1* | 6/2012 | Kazan | ..................... | H04L 67/02 715/753 |
| 2012/0158503 A1* | 6/2012 | Mardikar | ........... | G06Q 30/0269 705/14.53 |
| 2012/0246684 A1* | 9/2012 | Yarvis | .................... | G06Q 30/02 725/60 |
| 2013/0117263 A1* | 5/2013 | Lukose | .................... | G06F 16/20 707/736 |
| 2013/0138508 A1* | 5/2013 | Gee | .................. | H04N 21/42202 705/14.58 |
| 2014/0350349 A1* | 11/2014 | Geurts | ................. | A61B 5/7475 600/300 |
| 2015/0032824 A1* | 1/2015 | Kumar | .................. | G06F 3/0482 709/206 |
| 2015/0193888 A1* | 7/2015 | Sayed | ..................... | H04W 4/21 705/319 |
| 2015/0220985 A1* | 8/2015 | Mardikar | ........... | G06Q 30/0269 705/14.53 |
| 2015/0269628 A1* | 9/2015 | Urtso | .................... | H04L 67/306 705/14.66 |
| 2015/0281802 A1* | 10/2015 | Park | ...................... | H04N 21/812 725/32 |
| 2016/0055129 A1* | 2/2016 | Kan | .................... | G06Q 30/0277 715/249 |
| 2016/0063560 A1* | 3/2016 | Hameed | ............. | G06Q 30/0269 705/14.61 |
| 2016/0078471 A1* | 3/2016 | Hamedi | .............. | H04L 67/1072 705/14.41 |
| 2016/0232352 A1* | 8/2016 | Chen | ...................... | G06F 21/316 |
| 2019/0220893 A1* | 7/2019 | Mardikar | ........... | G06Q 30/0269 |
| 2020/0160385 A1* | 5/2020 | Chan | .................. | G06Q 30/0255 |

OTHER PUBLICATIONS

STIC EIC 3600 Search Report for application 16193206 dated May 20, 2020. (Year: 2020).*

Disclosed Anonymously, "Real-Time Targeted Advertisement System Using Sentiment Analysis", ip.com No. IPCOM000243607D, Publication Date: Oct. 5, 2015, 3 pages.

Lee et al., "Classifying Different Emotional States by Means of EEG-Based Functional Activity Patterns" Apr. 2014, 13 pages.

Rohit Sharma et al., "Method and System to Serve Sentiment Enabled Ads Based upon User's Dynamic Emotion" ip.com No. IPCOM000222453D, Publication Date: Oct. 9, 2012, 4 pages.

Vasthimal et al., "Method and System for Targeting Advertisements Based on Emotions Experienced While Watching Video", ip.com No. IPCOM000217791D, Publication Date: May 14, 2012, 3 pages.

Peter Mell et al., "The NIST Definition of Cloud Computing", National Institute of Standards and Technology, Special Publication 800-145, Sep. 2011, 7 pages.

* cited by examiner

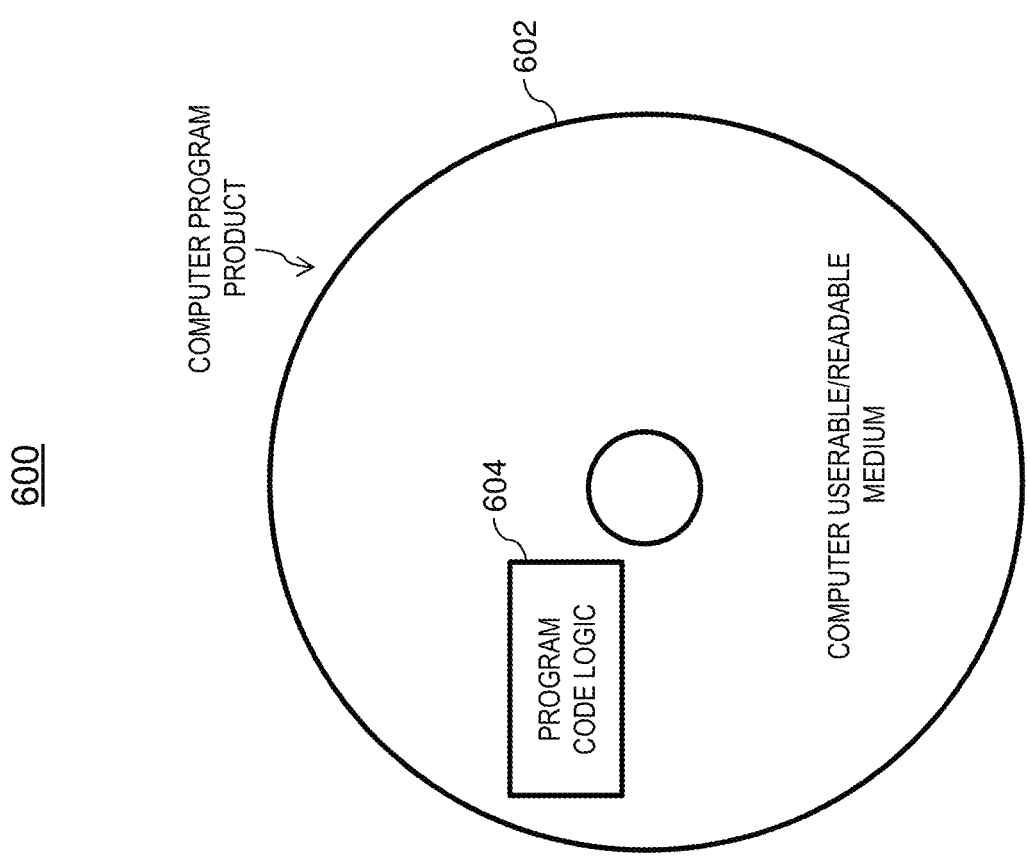

DELIVERING ADVERTISEMENTS BASED ON USER SENTIMENT AND LEARNED BEHAVIOR

BACKGROUND

The present invention generally relates to computing networks, and more specifically, to embodiments for delivering advertisements based on user sentiment and learned behavior.

Advertisement can be useful in attracting a user's attention to a particular service and/or product. In today's environment, advertisements are presented to users in a variety of ways. For example, advertisements can be provided to the user in a banner of an email, pop-up windows, social media applications, games, video clips, and the like. The selection of advertisements can cover a wide range and can be targeted to a particular user based on a variety of factors. For example, advertisements can be targeted to a particular user based on their age, association with one or more organizations, or a search history.

SUMMARY

Embodiments of the present invention are directed to a computer-implemented method for delivering advertisements based on user sentiment and learned behavior. A non-limiting example of the computer-implemented method includes collecting emotional information of a user; monitoring user interactions based at least in part on the collected emotional information of the user; determining a pattern of user interactions with one or more applications of a user device based on the emotional information; determining a pattern of user responses to an advertisement based on the emotional information; and generating a profile based at least in part on the pattern of user interactions and the pattern of user responses.

Embodiments of the present invention are directed to a system for delivering advertisements based on user sentiment and learned behavior. A non-limiting example of the system includes a storage medium, the storage medium being coupled to a processor, where the processor is configured to collect emotional information of a user; monitor user interactions based at least in part on the collected emotional information of the user; determine a pattern of user interactions with one or more applications of a user device based on the emotional information; determine a pattern of user responses to advertisements based on the emotional information; and generate a profile based at least in part on the pattern of user interactions and the pattern of user responses.

Embodiments of the invention are directed to a computer program product for delivering advertisements based on user sentiment and learned behavior, the computer program product comprising a computer-readable storage medium having program instructions embodied therewith. The program instructions are executable by a processor to cause the processor to perform a method. A non-limiting example of the method includes collecting emotional information of a user; monitoring user interactions based at least in part on the collected emotional information of the user; determining a pattern of user interactions with one or more applications of a user device based on the emotional information; determining a pattern of user responses to an advertisement based on the emotional information; and generating a profile based at least in part on the pattern of user interactions and the pattern of user responses.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 depicts a computer program product in accordance with one or more embodiments of the invention.

Figure 1:
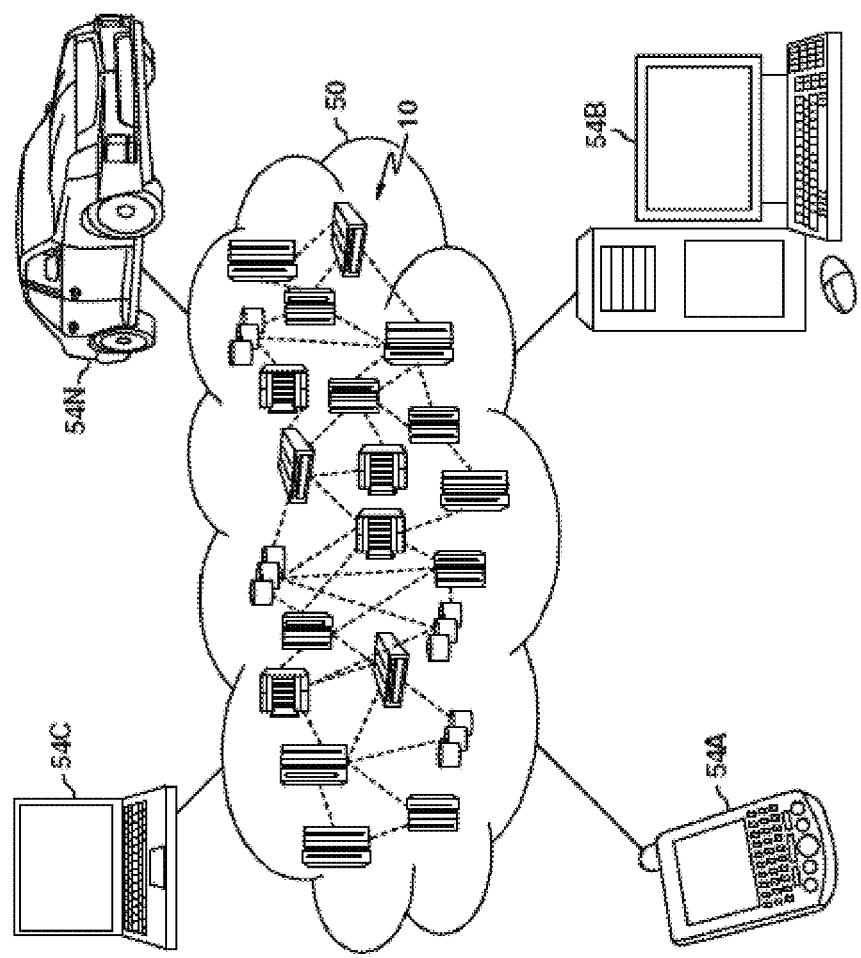
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
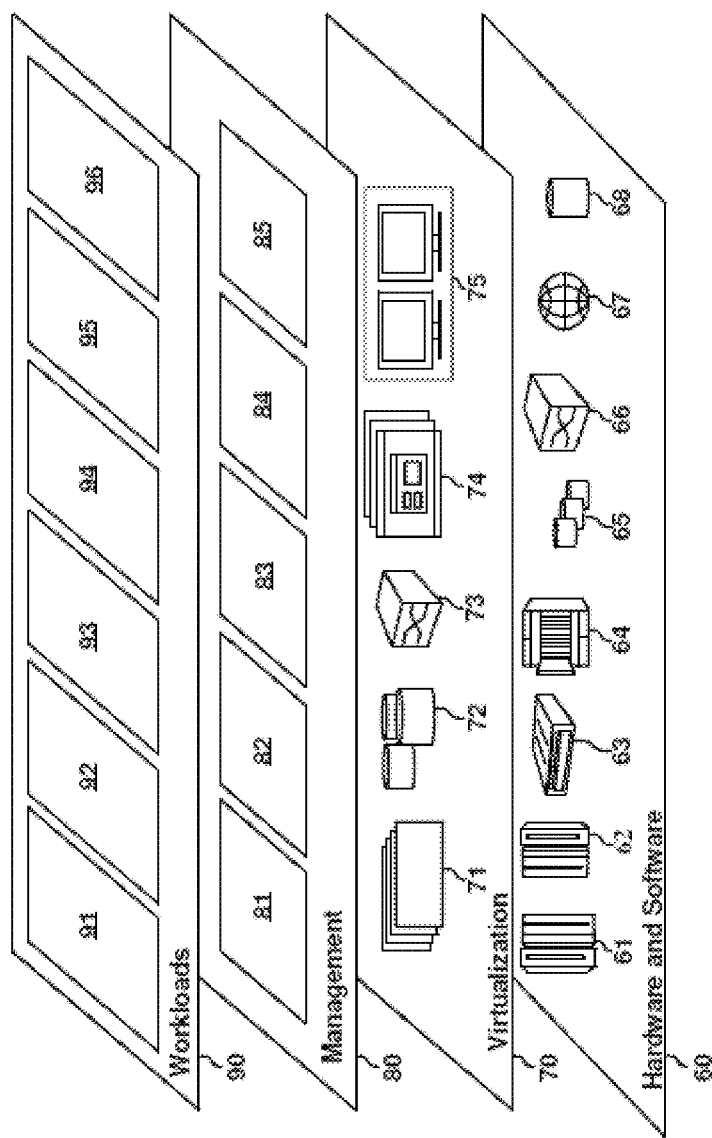
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and action analytics and notifications 96.

Turning now to an overview of technologies that are more specifically relevant to aspects of the invention, currently advertisement services select content to provide to a user based on the text provided in a search query or content that is frequently visited and/or liked (interest) content. For example, a user may send an email related to a sport and an advertisement related to the sport can be provided to a user. The advertisement can provide an option to buy tickets to an upcoming event or vendors that sell sports clothing related to the preferred team. In addition, a user that is visiting a particular location advertisements that are provided to the user can include advertisements for restaurants, activities, etc. that are within proximity of the user. Other techniques are used to direct advertisements to the user.

In today's environment, advertisement services are limited in the information that can be obtained from a user. For example, the current techniques fail to factor contextual information related to the user such as the user's current mood and/or emotional state. The current techniques also fail to consider a pattern of a user's interactions with applications based on the current mood. Finally, the techniques fail to provide a link between the detected user's mood/emotional state and the user's patterned behavior of interacting with a mobile device, computing device, and/or other user device. Because these factors are not used, the effectiveness of the advertisement received by the user is tracked and is not leveraged to select advertisements for the user.

Turning now to an overview of the aspects of the invention, one or more embodiments of the invention address the above-described shortcomings of the prior art by providing detecting a user's current emotional state and mapping the user's emotional state to a user's behavior when interacting with a user device. The effectiveness of an advertisement is variable and on many occasions, if the target audience is not in the appropriate emotional state they may not follow the advertisement. In addition, users may exhibit behaviors during a specific emotional state where they to become very susceptible to certain advertisements.

The above-described aspects of the invention address the shortcomings of the prior art by identifying user behaviors during a specific emotional state and determining patterns of how the user responds to various types of advertisements to push advertisements to the user in a targeted manner. The techniques described herein generate a profile based on the determined patterned behavior and the corresponding emotional state of a user and to target advertisements for the user. The effectiveness of an advertisement can be indicated by a user making a purchase based on the advertisement or a user reading/watching the entire advertisement that is provided to the user.

Figure 3:
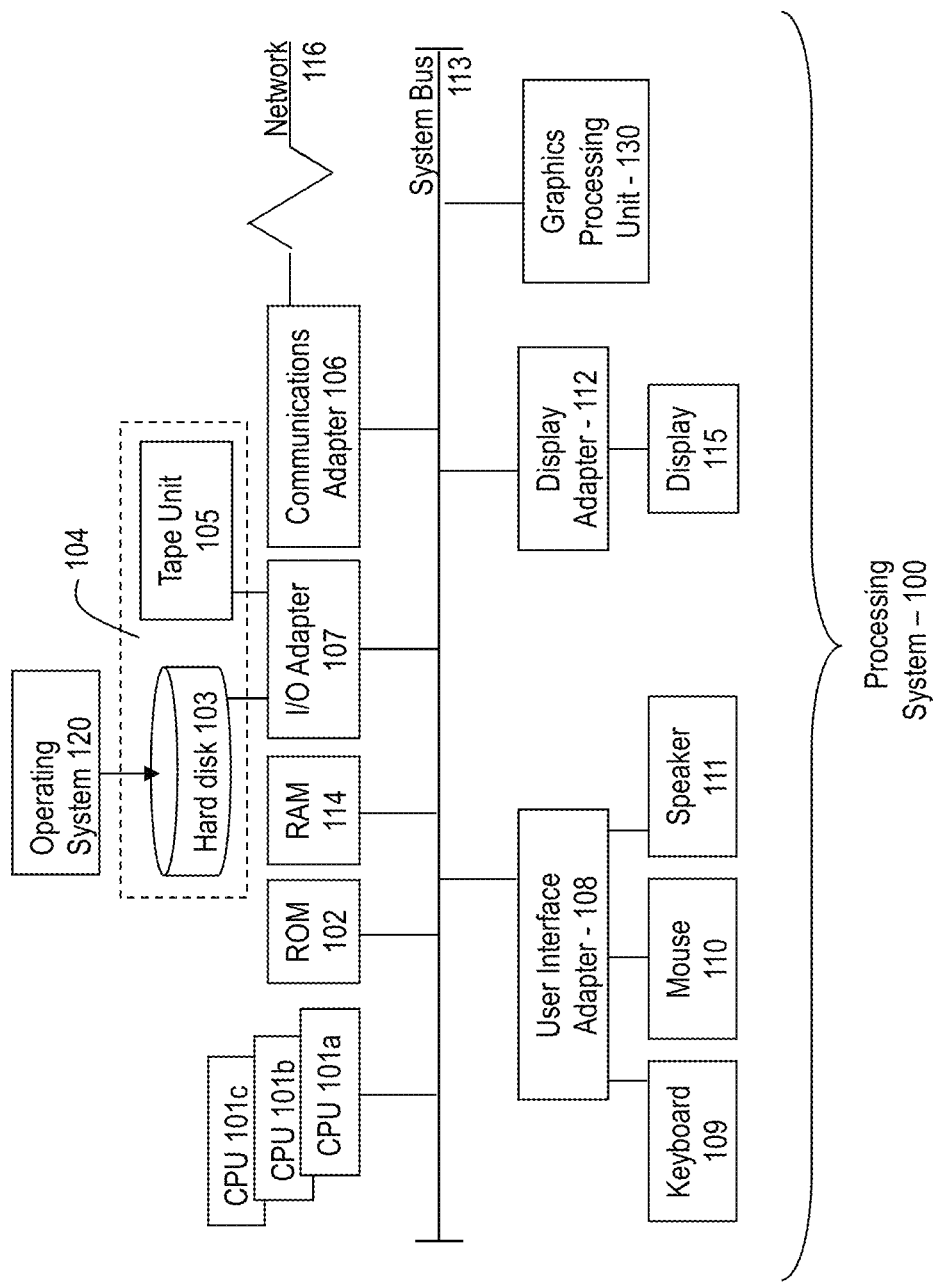
FIG. 3 is a block diagram illustrating one example of a processing system for use in practicing the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including the system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

Figure 4:
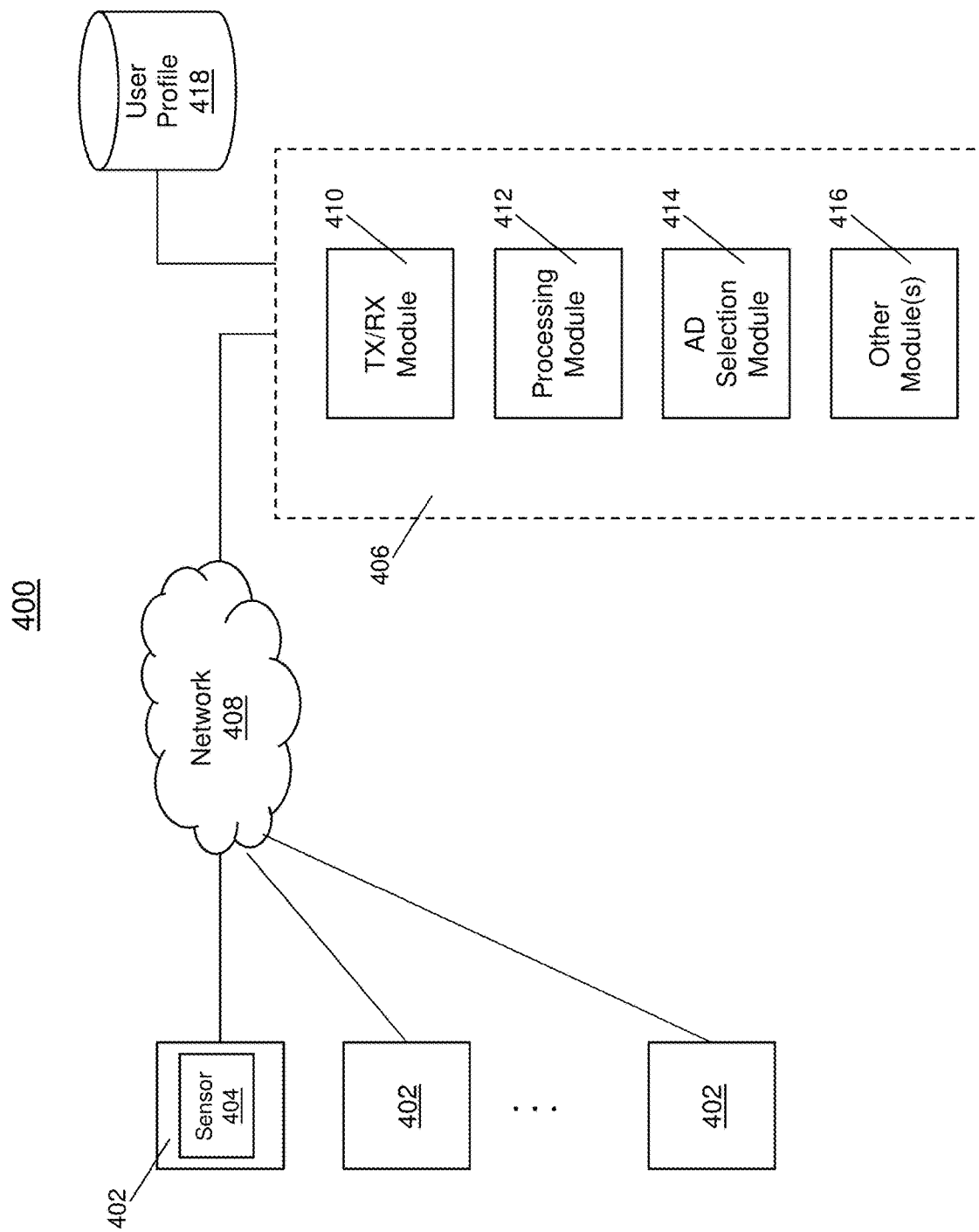
FIG. 4 depicts a system for delivering advertisements based on user sentiment and learned behavior in accordance with one or more embodiments of the invention.

Now referring to FIG. 4, a system 400 for delivering advertisements based on user sentiment and learned behavior in accordance with one or more embodiments is shown. It is to be understood the system 400 can include one or more elements shown in FIGS. 1-3.

The system 400 includes a user device 402, and the user device 402 can be equipped with one or more sensors 404 to detect an emotion of a user. In one or more embodiments of the invention, the emotion can be determined based on detecting a person's speech, facial expressions, physiological signals, etc. The system 400 and/or user device 402 can include one or more sensors 404 for sensing an emotion of the user. In other embodiments of the invention, the sensor 404 can be located external to a user device 402 such as a wearable device, audio receiving information, the video camera that can be used to obtain data to perform an image analysis to determine a user emotion. The sensors 404 can be equipped in rooms to determine user emotions, jewelry, wearables, etc. In addition, the user emotion can be detected by a user's social network data and/or feeds, text messages, etc.

The tone which can indicate an emotion of a user can be detected by an audio device such as a microphone. In addition, emotional information can be determined by monitoring the text entered on a user device by filtering the text for keywords such as performing the sentimental analysis. The sentiment analysis module may be provided by an application program interface (API). The above mentioned APIs are mentioned for exemplary purposes. Any cognitive AI can be utilized within the sentiment analysis module. The sentiment analysis module can process natural language to incorporate both a linguistic and statistical analysis in evaluating the context of a communication. In text analysis, the sentiment is the attitude or opinion expressed toward something. Sentiment can be positive, "sounds good", negative, "this is bad", or neutral. Sentiment can be calculated based on keywords extracted and evaluated at a keyword level. Additionally, the sentiment analysis may be capable of identifying negations, such as the term "not" and the change in sentiment from the keyword "good" when the phrase is "not" "good". The sentiment analysis may consider intensity when the terms "very" or other adjectives are utilized in combination with a keyword. Additionally, the keywords may be weighted. For instance, a positive phrase such as "like" will have a predefined positive weight, whereas the phrase "love" might have a higher predefined positive weight. Additionally, negative weights may be afforded negative phrases such as "dislike" would have a predefined negative weight and the phrase "hate" might have a higher negative weight. The sentiment analysis module can evaluate the content to provide a sentiment level. This sentiment level may also include an intensity value.

The tonal analysis module may include a tonal analyzer service, for example. The tonal analysis module can use linguistic analysis to detect three types of tones from the text. The natural language content is analyzed by the tonal analysis module for determining the emotional impact, social tone, and writing style that the content projects. The tonal analysis module may provide tonal scores for emotional tone, social tone, and language tone. For emotional tone, the tonal analysis module may utilize the emotions for "joy", "fear", "sadness", "disgust" and "anger". Each natural language element is evaluated with respect to each emotion. Each emotion may be evaluated from lower values having a value range that indicates if that emotion is less likely to appear as perceived or alternatively to a higher value range if the emotion is more likely to be perceived with respect to each natural language content. Other emotions may be utilized as well as a different value score.

For social tone, the five elements of openness, conscientiousness, extraversion, agreeableness, and emotional range are utilized. Openness is evaluated as the extent a person is open to experience a variety of activities. This trait may be provided a value range indicating that it is more likely to be perceived as no-nonsense, straightforward, blunt and obvious, alternatively, a higher value range may be provided if the content indicates that it will be perceived as intellectual, curious, emotionally-aware, or imaginative. Conscientiousness is evaluated as the tendency to act in an organized or thoughtful way. This trait may be provided a value range if the presentation is perceived as spontaneous, laid-back, reckless, unmethodical or disorganized, or alternatively, a higher value range may be provided if the content is perceived as disciplined, dutiful, or confident. Extraversion is evaluated as the tendency to seek stimulation in the company of others. This trait may be provided a value range if perceived as independent, timid, introverted, restrained, boring, or alternatively, a higher value range may be provided if the content is perceived as engaging, seeking attention, assertive, sociable. Agreeableness is evaluated as the tendency to be compassionate and cooperative towards others. This trait may be provided a value range if the presentation is perceived as selfish, uncaring, uncooperative, confrontational or arrogant, or alternatively, a higher value range may be provided if the content is perceived as caring, sympathetic, cooperative, or trustworthy. The emotional range is evaluated as the tendency to be sensitive to the environment. This trait may be provided a value range if the presentation is perceived as calm, bland, content, relaxed or alternatively a higher value range may be provided if the content is perceived as concerned, frustrated angry, passionate, upset, stressed or impulsive. These tones, descriptions, and weights are merely illustrative and additional tones, descriptions or weights may be utilized.

Language tones may be analyzed to measure the user's writing style. The various styles may include analytic, confidence and tentative. The analytic style may focus on the individual's reasoning and analytical attitude about things. The analytic style may be provided a value range if the text contains little or no evidence of analytical tone or alternatively a higher value range if the presentation is more likely to be perceived as intellectual, rational, systematic, emotionless, or impersonal. The confidence style may focus on the presenter's degree of certainty. The confidence style may be provided a value range if the text contains little or no evidence of confidence in tone or alternatively a higher value range if the style is more likely to be perceived as assured, collected, hopeful or egotistical. The tentative style may focus on the presenter's degree of inhibition. The tentative style may be provided a lower value range if the text contains little or no evidence of tentativeness in tone or a higher value range if the style is more likely to be perceived as questionable, doubtful limited, or debatable. The word stemming and summation module. The sentiment analysis can be executed in the server 406 in the processing module 412 or in the user device 402. In other embodiments of the invention, the user emotion information can be provided to a server 406 over a network.

In addition, the server 406 includes a plurality of modules 410-416 to perform the techniques described herein. The server 406 includes a transmitter/receiver (TX/RX) module 410 that is configured to communicate with one or more user devices 402 over a network 408 and one or more external components. For example, the server 406 is configured to receive user information including emotional information and behavior information and the server is configured to transmit data such as a particular advertisement. The server 406 also includes a processing module 412 that is configured to perform a number functions that include monitoring user information and processing the user information to determine a pattern in the user's interactions with a computing device and determine a pattern in the user's responses to an advertisement.

In one or more embodiments of the invention, a user pattern is determined over a period of time and mapped to a detected emotion. The period of time can be configurable by a user and can be a period such as a day, week, month, etc. The user pattern of interactions can track how a user interacts with different websites or applications. For example, a sequence of applications that a user routinely visits or uses to make purchases or other data indicating how the user manipulates the user device 402.

In one or more embodiments of the invention, the server 406 is configured to determine a pattern in the user responses to particular advertisements or types of advertisements during a determined emotional state. For example, responsive to receiving an advertisement the server 406 can determine whether the user has made a purchase or followed a particular link associated with the advertisement. These user patterns can be mapped to the user's emotion.

In one or more embodiments of the invention, server 406 can also store user information in a user profile 418 related to the channels that a user receives the advertisements. The channel information can include devices such as a mobile phone, laptop computer, tablet, or another type of device. A device ID can be used to identify the channel such as an IP address, MAC address, device ID, etc. The channel information can also indicate the type of user device that a user is likely to interact with. For example, a user may be likely to view advertisements on a desktop computer instead of on a mobile phone due to the limited battery restriction. In addition, channel information can also include information pertaining to applications that are frequently visited by a user such as a social media application, email application, shopping website, etc. The applications can be associated with an application ID such as a URL and stored in a user profile 418. It should be understood that other types of application IDs can be used to monitor the user's behavior. The channel information can also identify various sources that provide advertisements to the user such as advertisements provided on specific social media platforms, streaming services, emails, retailers, etc. A history can be stored in the user profile 418 to determine the user's typical interactions. In one or more embodiments of the invention, the user history can be mapped to the emotional state of the user.

The system 400 is also configured to monitor the manner in which the advertisement is delivered to the user. In one or more embodiments of the invention, the system 400 can determine if one channel of providing the advertisement is more successful than others. For example, it can be determined whether a pop-up advertisement or an advertisement provided in a banner is on a web page is selected. The success of an advertisement can be determined according to a user making a purchase based on the received advertisement or a user watching a complete video advertisement instead of skipping over it. It should be understood that other techniques can be used to determine the effectiveness of the advertisement.

In one or more embodiments of the invention, one or more pieces of information can be used to generate a profile that can be used to select an advertisement for a user. The selection of an advertisement by an ad selection module 414 can be based on the user's behavior during a particular mood and the user's reactions to advertisements during the particular mood. In one or more embodiments of the invention, the user profile 418 can be updated at a configurable interval. In addition, the update can occur according to a user input and the detection of an event.

In one or more embodiments of the invention, a user can set their preferences for targeted advertisements. In other embodiments of the invention, the user's preferences can be monitored and determined over a period of time. In one or more embodiments of the invention, a default setting can be used to select advertisements by the ad selection module 414. In one example, the default settings can be based on segments such as an age range 20-25, 26-34, 35+, etc. until a threshold level of data related to the user has been collected. The threshold can indicate a period of time or a threshold number of samples to generate a user profile. A user's age can be obtained from a user profile of a social network, an email profile, device profile, or any other location that stores. Each should be understood that segments can be based on other factors such as common interests in sports, clubs, schools, etc.

A user profile 418 can store the mood, pattern of user behavior, and pattern of responding to advertisements. The user profile 418 can also include advertisement type information indicating categories including but not limited to sports, education, news, shopping, services, etc. In addition, the advertisements can also include subcategories within each of the categories. For example, the sports category of advertisements can include basketball, football, baseball, and the like, where the advertisements are selected based on the user's current mood.

In an example, the system 400 determines user patterns of behavior when a user is in a particular mood. For example, a user when determined to be in a happy mood by a device, a user's interactions are monitored to determine a pattern in the user's interactions. The pattern can include online shopping on a mobile device during a happy mood. The pattern can include additional information such as determining a user attends local sporting events. The additional information can include team information, location information, win/loss information, etc. In the event the user's preferred team wins, the user is likely to be in a happy mood and purchase team-related merchandise. In the event the user's preferred team loses, the user may have a habit of not purchasing team gear but searching social media.

The system 400 also determines a pattern of reactions to the advertisements or other content when the users are in a particular mood. For example, the system 400 can determine when the user's team wins, advertisements that are targeted to the user related to the user's team result in a purchase. On the other hand, the system 400 can determine when the user's team loses, the advertisements that are related to the user's team do not result in a purchase.

Individuals may have different behaviors according to specific moods. In a non-limiting example, when John is sad he may watch sports to cheer him up. However, when Jane is sad, she may like to shop online. Even further, when Joe is sad, he may like to buy luxury items. The emotional state of each user is sad, but each person has a different behavior/pattern behind their emotional state. John may only click on advertisements on the side of his web page, while Jane is more likely to interact with pop-ups while she is surfing the website she is purchasing.

Figure 5:
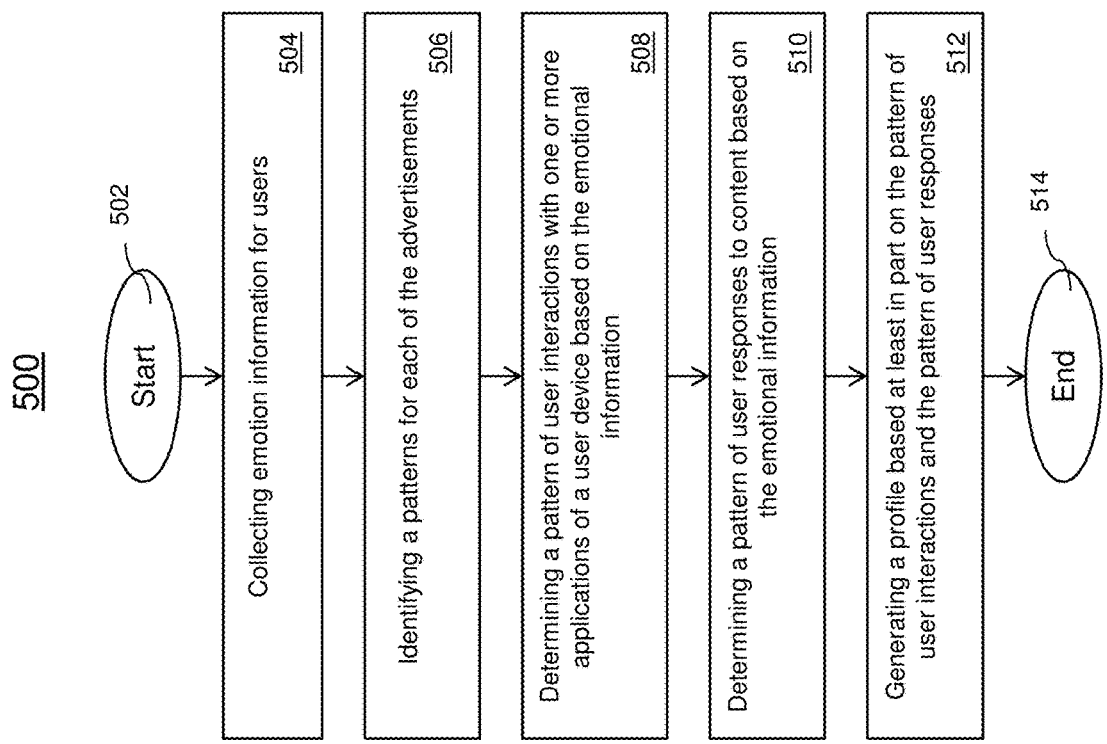
FIG. 5 depicts a flow diagram illustrating a method for delivering advertisements based on user sentiment and learned behavior in accordance with one or more embodiments of the invention.

Now referring to FIG. 5, a flowchart of a method 500 for delivering advertisements based on user sentiment and learned behavior in accordance with one or more embodiments of the invention. The method 500 can be implemented in any of the systems shown in FIGS. 1-4. The method 500 begins at block 502 and proceeds to block 504 which provides for collecting emotional information of a user. At block 506, the method 500 provides for monitoring user interactions based at least in part on the collected emotional information of the user. Block 508 provides for determining a pattern of user interactions with one or more applications of a user device based on the emotional information. Block 510 provides for determining a pattern of user responses to content based on the emotional information. The method 500 at block 512 provides for generating a profile based at least in part on the pattern of user interactions and the pattern of user responses. In one or more embodiments of the invention, a default profile can be used to select content for the user until a threshold limit of data is collected. The method 500 ends at block 514.

Referring now to FIG. 6, a computer program product 600 in accordance with an embodiment that includes a computer-readable storage medium 602 and program instructions 604 is generally shown.

The techniques described herein improve over the prior art by detecting and leveraging a user's emotional state and user's typical behavior of interaction with applications during the detected emotional state to select advertisements to provide to the user.

One or more embodiments of the invention improve over the prior art by increasing the likelihood of the effectiveness of the selection of a targeted advertisement and by also increasing a user experience by factoring the user emotion. Once a pattern or behavior is determined, the system can use this information to better determine the most appropriate vehicle to push advertisements to those users at particular moments.

In a non-limiting example, there can be multiple advertisements that a user might be interested in. These advertisements can be determined using existing techniques, such as analyzing the browsing history, email content, etc. In some cases, these advertisements are ranked according to the effectiveness of the advertisement, where the effectiveness is based on the likelihood the advertisements will clicked by a user or will result in a purchase. The effectiveness of specific advertisements can be used in conjunction with the user's emotional state to select advertisements for the user. In some embodiments of the invention, when the user's emotional state and behavior pattern indicate a high likelihood of the user making a purchase, the most effective advertisement can be selected and presented to the user. This will further maximize the conversion rate.

In another non-limiting example, the advertising system can provide multiple level of services to an advertiser based on the likelihood of a user making a purchase. The different level of services can be identified using the emotional state and user behavior. The level of services can include a "high level" which indicates high confidence that a user will make a purchase for the specific product; a "medium level" which indicates a medium confidence that a user will make a purchase for the specific product; or a "low level" which indicates a low confidence that a user will make a purchase for the specific product. In a different non-limiting example, a specific advertisement can be provided when a particular program is provided and a particular mood is detected such as presenting the advertisement when the user is in happy mood after a sports game". It should be understood that any number of service levels can be used to provide different levels of granularity to the advertisement system.

The techniques described herein provide a system and method for determining how an advertisement will be received based on specific emotions. In addition, techniques described herein provide for an analysis of an individual's emotions, recognize patterns/behaviors and will determine the best source for advertisements based on the associated emotion.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for identifying how to push advertisements based on emotion and learned behavior, the computer-implemented method comprising:
   collecting emotional information of a user;
   monitoring user interactions based at least in part on the collected emotional information of the user;
   determining a pattern of user interactions with one or more applications of a user device based on the emotional information, wherein determining the pattern of user interactions comprises determining, within the one or more applications, if the user interacts with a pop-up advertisement, a link to an advertisement, a video advertisement, and an advertisement provided in a banner of a webpage;
   determining a pattern of user responses to an advertisement based on the emotional information;
   generating a profile based at least in part on the pattern of user interactions and the pattern of user responses;
   detecting an emotional state of the user;

selecting the advertisement and the interaction within one or more applications based at least in part on the emotional state of the user and the profile;

responsive to selecting the advertisement, determining a channel to transmit the selected advertisement, wherein the channel identifies one or more types of applications and one or more types of user devices, wherein the channel is determined based on a success; and transmitting the selected advertisement to the user device through the determined channel based at least in part on the success and displaying, on a display, the selected advertisement in the determined interaction within one or more applications on the user device.

2. The computer-implemented method of claim 1, further comprising classifying the pattern of user interactions and the pattern of user responses based at least in part on an emotional state of the user.

3. The computer-implemented method of claim 1, wherein determining the pattern of user interactions comprises using social network applications, a messaging application, a gaming application, a retail website, or a search engine.

4. The computer-implemented method of claim 1, wherein determining the pattern of user responses comprises determining whether an advertisement has resulted in a retail purchase related to the advertisement.

5. The computer-implemented method of claim 1, further comprising selecting advertisements based on one or more advertisement service levels, wherein each of the one or more advertisement service levels indicates a probability the selected advertisements result in a purchase.

6. A system for identifying how to push advertisements based on emotion and learned behavior, the system comprising:
- a storage medium, the storage medium being coupled to a processor;
- the processor configured to:
  - collect emotional information of a user;
  - monitor user interactions based at least in part on the collected emotional information of the user;
  - determine a pattern of user interactions with one or more applications of a user device based on the emotional information;
  - determine a pattern of user responses to advertisements based on the emotional information, wherein determining the pattern of user interactions comprises determining, within the one or more applications, if the user interacts with a pop-up advertisement, a link to an advertisement, a video advertisement, and an advertisement provided in a banner of a webpage;
  - generate a profile based at least in part on the pattern of user interactions and the pattern of user responses;
  - detect an emotional state of the user;
  - select the advertisement and the interaction within one or more applications based at least in part on the emotional state of the user and the profile;
  - responsive to selecting the advertisement, determine a channel to transmit the selected advertisement, wherein the channel identifies one or more types of applications and one or more types of user devices, wherein the channel is determined based on a success; and
  - transmit the selected advertisement to the user device through the determined channel based at least in part on the success and display the selected advertisement in the determined interaction within one or more applications on the user device.

7. The system of claim 6, wherein the processor is further configured to classify the pattern of user interactions and the pattern of user responses based at least in part on an emotional state of the user.

8. The system of claim 6, wherein determining the pattern of user interactions comprises using social network applications, a messaging application, a gaming application, a retail website, or a search engine.

9. The system of claim 6, wherein determining the pattern of user responses comprises determining whether an advertisement has resulted in a retail purchase related to the advertisement.

10. The system of claim 6, further comprising determining a channel to transmit the selected advertisement, wherein the channel identifies one or more types of applications and one or more types of user devices.

11. A non-transitory computer program product for identifying how to push advertisements based on emotion and learned behavior, the computer program product comprising a computer-readable storage medium having program instructions embodied therewith, the program instructions executable by a processor to cause the processor to:
- collect emotional information of a user;
- monitor user interactions based at least in part on the collected emotional information of the user;
- determine a pattern of user interactions with one or more applications of a user device based on the emotional information, wherein determining the pattern of user interactions comprises determining, within the one or more applications, if the user interacts with a pop-up advertisement, a link to an advertisement, a video advertisement, and an advertisement provided in a banner of a webpage;
- determine a pattern of user responses to advertisements based on the emotional information;
- generate a profile based at least in part on the pattern of user interactions and the pattern of user responses;
- detect an emotional state of the user;
- select the advertisement and the interaction within one or more applications based at least in part on the emotional state of the user and the profile;
- responsive to selecting the advertisement, determine a channel to transmit the selected advertisement, wherein the channel identifies one or more types of applications and one or more types of user devices, wherein the channel is determined based on a success; and
- transmit the selected advertisement to the user device through the determined channel based at least in part on the success and display the selected advertisement in the determined interaction within one or more applications on the user device.

12. The computer program product of claim 11, wherein the instructions are further executable by the processor to cause the processor to classify the pattern of user interactions and the pattern of user responses based at least in part on an emotional state of the user.

13. The computer program product of claim 11, wherein determining the pattern of user interactions is based on at least one of a social network applications, a messaging application, a gaming application, a retail website, or a search engine.

14. The computer program product of claim 11, wherein determining the pattern of user responses comprises determining whether an advertisement has resulted in a retail purchase related to the advertisement.

15. The computer program product of claim 11, wherein the instructions are further executable by the processor to cause the processor to determine a channel to transmit the selected advertisement, wherein the channel identifies one or more types of applications and one or more types of user devices.

* * * * *